Dec. 12, 1967   R. A. SUTPHIN   3,357,072
RELIEVED SKIRTED DIE
Filed Oct. 14, 1964

INVENTOR.
Richard A. Sutphin
BY
*ATTORNEY*

United States Patent Office 3,357,072
Patented Dec. 12, 1967

3,357,072
RELIEVED SKIRTED DIE
Richard A. Sutphin, Greenhills, Ohio, assignor to The Procter & Gamble Company, Cincinnati, Ohio, a corporation of Ohio
Filed Oct. 14, 1964, Ser. No. 403,797
3 Claims. (Cl. 25—7)

ABSTRACT OF THE DISCLOSURE

In a die pair for stamping pin-die shaped articles and with which scrap extrusion is restricted to minor portions of the peripheral edges of the die halves, the provision of relief passageways to reduce hold time and stamping force requirements. The relief passageways have a cumulative cross-sectional area of at least about .0036 square inch and each has a minimum cross-sectional area of about .0007 square inch and width to height ratio of 3:1 or less.

---

This invention relates to dies adapted to form plastic materials into articles having a "pin-die" shape and more particularly to high-speed dies adapted to stamp "pin-die" shaped bar soaps or detergents by means of skirted dies, including provision to shorten the extrusion cycle and/or reduce the total stampling forces acting on the stamping machine.

Articles, such as bar soaps, have been formed into "pin-die" shapes for many years. As used in the trade, an article having a "pin-die" shape is one which is adapted to be stamped by means of a die pair having peripheral surfaces or lands adapted to meet in substantial face-to-face contact, in contrast to die stamping by means of a box die, or a pin-box die, wherein the peripheral edges of the opposed surfaces which apply molding pressure to form the article are not brought into contact. In the most familiar embodiments of the latter forms of dies, one die half is telescoped within a passageway in a box portion, which passageway surrounds the other die half and provides the mold surfaces interconnecting the peripheral edges of the die halves. Thus, either the box die, or the pin-box die, stamps an article having ends and side panels with the surfaces thereof formed with a continuous flat band therearound as a result of being molded to the shape of the box passageway between the peripheral edges of the die halves, whereas an article having a "pin-die" shape has no such band.

As normally performed, the process of stamping pin-die shaped bars is one wherein surplus material is extruded in all directions from the periphery of the bar, necessitating a trimming operation which is either performed manually or with a special automatic trimming mechanism built into or acting in conjunction with the die halves. If done manually, the trimming process is expensive and frequently leaves a rough ridge about the bar along the line at which the surplus material is separated. Automatic trimming, on the other hand, tends to produce a neater looking trim line but results in the deposit of the scrap surplus material surrounding the machinery and the die halves, compelling a continuous and difficult cleanup and scrap collection operation.

Many formulations of soap and/or detergent (hereinafter referred to jointly as soap), although desirable from a product performance standpoint, do not possess the degree of plasticity or reweldability conducive to good stamping operation. As now practiced, the stamping of such formulations into pin-die shaped bars frequently results in a product having a number of hairline cracks, substantially following the direction of crystal orientation, in the side or on the face panels of the bar. This type of defect is particularly prevalent where a plodder makes identical soap blanks for various shapes of bar soaps or where it is impractical to extrude blanks having a cross section approximating that of the finished bar.

Copending application for U.S. Letters Patent Ser. No. 81,037, filed Jan. 6, 1961, now U.S. Patent 3,159,699, is directed to apparatus and process for stamping pin-die shaped articles from plastic materials. The apparatus of the copending application comprises a die pair provided with means to prevent extrusion of surplus plastic material in both directions along one axis of the die pair while permitting such extrusion along an axis substantially perpendicular to the said one axis. By this means hand trimming of scrap is obviated, the collection of such scrap is facilitated and the hairline cracks mentioned are eliminated. The skirted form of die is well adapted for use in the standard pin-die stamping presses and may be used to great advantage in association with high-speed stamping presses. However, in applying the skirted form of dies to high-speed stamping presses, problems are encountered due to the force required to accomplish "pinch off" of scrap in the relatively short interval of time available during each cycle of continuous operation of such presses. As the "hold" time (that time during which the maximum force is exerted on the plastic material being formed) is reduced, the force required increases considerably with the skirted die due to the fact that scrap extrusion is restricted so as to occur along only a portion of the periphery of the die pair. The restriction of egress area prevents scrap from extruding as rapidly from a skirted die as it would from normal pin-die article die pairs and consequently greater pressure has to be applied in order to extrude the same quantity of scrap in the same interval of time. If all the scrap is not removed within the machine controlled hold time, "pinch off" will not occur and bar appearance will suffer. Such will also result in oversize and overweight bars (which could cause problems in subsequent operation) and cause scrap removal difficulties.

It is an object of the present invention to obviate the above shortcomings of the prior art devices.

It is another object to improve the skirted die pair of the aforesaid application in such a way as to substantially preserve all the advantages of the die pair while adapting it for use on high speed production equipment.

A further object of the present invention is to provide for pin-die shaped soap products, a die which obviates the necessity of hand trimming of surplus material, facilitates the collection of such surplus material, eliminates objectionable hairline cracks in the side or on the face panels of the product, shortens the scrap extrusion cycle and/or reduces the total stamping forces acting on the press and alleviates bar removal problems.

Briefly stated, in accordance with one aspect of this invention, there is provided a die pair for stamping plastic material into an article, comprising mating die halves each having a cavity bounded by a narrow land, means to restrict the extrusion of scrap from said die pair whereby such occurs between minor portions of said lands and relief means comprising a plurality of passageways extending from the enclosure formed by said cavities during the period of final deformation of said plastic material. The passageways have a cumulative cross sectional area of at least about .0036 square inch and each has a minimum cross sectional area of at least about .0007 square inch.

While the specification concludes with claims particularly pointing out and distinctly claiming the subject matter which is regarded as the present invention, it is believed that the invention will be better understood from the following description of a preferred embodiment taken in connection with the accompanying drawings in which:

Figure 1:
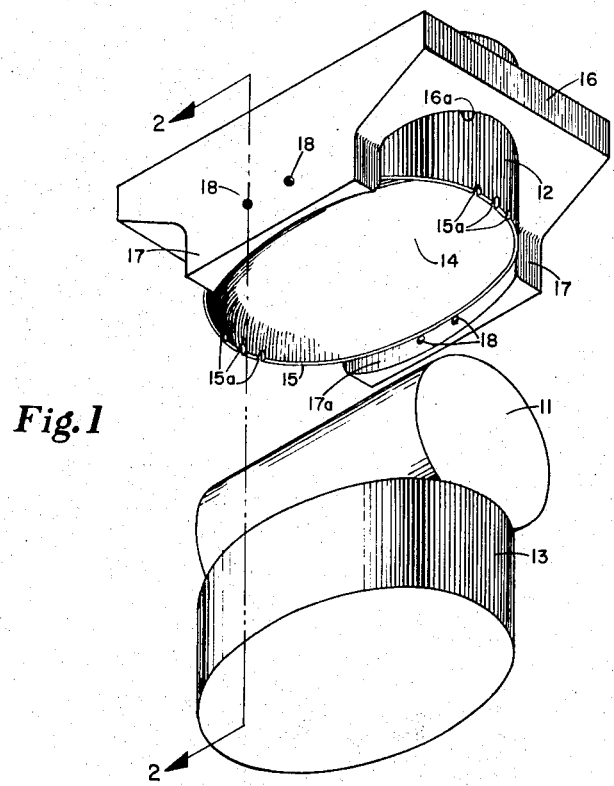
FIGURE 1 is a perspective view showing a skirted die of this invention with a soap blank between the die halves.

Referring to FIGURE 1, an exemplary soap blank 11 is shown intermediate a pair of mating die halves, upper die half 12 and lower die half 13, in a position to be stamped between the die halves 12 and 13 so as to be molded to the shape of the die cavities 14. The soap blank 11 which is preferably milled soap, is taken as a freshly cut piece of a continuous extrusion of soap produced by a soap "plodder." At this time the soap blank 11 is in a warm and plastic condition and is best suited for the stamping operation since the blank 11 must be considerably deformed in order to be made to conform to the die cavities 14. As in other stamping operations a stamp die liquor, such as a brine solution, is used as a lubricating and release agent, preferably by application of the liquor to the soap blank 11 before the placement thereof in position for the stamping operation. The specific liquor used and the method of its application, of course, are matters of choice and many variations thereof are well known in the art.

The continuously extruded long bar from the soap "plodder" has a "grain" structure or crystalline arrangement which has been oriented in the direction of the extrusion. Since the soap blank 11 is cut from the long bar, it, too, has a "grain" in the extrusion direction—in this case lengthwise of the blank 11. Although it is possible that blanks 11 could be prepared with the "grain" running oppositely, i.e., transverse the long dimension, such is not usually the case. For this reason, as used herein the terms "length," or "longitudinal," or other words distinguishing one dimension or side from the other planar dimension in terms of greater physical size, should be interpreted as meaning the dimension of the die or blank which parallels the "grain" of the soap. Similarly, the terms "width," "across," "lateral," and other like descriptive words are intended to refer to the dimension of the die or blank which is transverse the direction of the "grain."

The soap blank 11 must, as in all similar stamping operations, be made to an optimum diameter for economy and best results for the size and shape of the bar being produced. This is a matter of experience once the dies have been prepared, and need not be discussed in detail herein. Along this same line, it is usual to cut the soap blank 11 longer than the die length by a finite amount to avoid what is termed a "water mark" in the industry. A "water mark" is the line of separation of two different or distinct shades of the color of the soap in a single bar and is usually found at each end of bars stamped from blanks shorter than the die length.

Each of the die halves, both upper die half 12 and lower die half 13, have cavities 14 formed therein which follow the contours of the exterior surface of the portion of the bar intended to be molded thereby. The outer surfaces of the die halves of the exemplary apparatus parallel the direction of die motion, thus being vertical. These vertical surfaces are identical in shape and each is perpendicular to the plane of the die face within which the cavity 14 is formed and has a cross section with a periphery which parallels the peripheral edge of its respective cavity.

Although such is not shown in the figures, various designs or printed matter could be engraved upon, or placed in bas-relief on, the surface of the cavities 14 so as to decorate and/or, identify the source of the bar produced by the die. Such, of course, is a common practice and presently well known to those skilled in the art. Similarly, other features well known in the industry could be incorporated in the die halves to promote production and ease of operation; for example, the use of ejectors to aid in the removal of the finished bar from the dies and the provision of passageways for the circulation of coolant through the die halves. While these features might operate to facilitate the stamping operation, they are not essential to the present invention and therefore not described in detail herein in order to set forth the best mode of carrying out the invention.

The cavities 14 are each surrounded by a land 15 of relatively narrow width defined by the peripheral edge of the cavities 14 and the outer vertical surface of the die halves. Preferably, for the normal range of bar sizes the width of land 15 should be less than $1/16''$ in order to eliminate the necessity of trimming. When thus dimensioned and upon the application of sufficient pressure during the stamping operation, any surplus soap extruded from the dies will be "pinched off" between the opposed mating lands 15, and the side panels and the ends of the bar will be clear of all such surplus.

The land 15 of upper die half 12 is formed with a plurality of notches 15a at each end, thereby presenting a path of unimpeded egress from the cavities 14 in the full impression position. The notches should each have a minimum cross sectional area of about .0007 square inch (equivalent to about the area of a .030" diameter passageway) in order to permit surplus product to flow therethrough without substantial frictional resistance and should have a cumulative cross sectional area of at least about .0036 square inch to achieve the desired results in stamping products such as conventionally sized household bar soaps. In addition, the notches having the minimum cross sectional area specified above should be proportioned with a width to height ratio not to exceed about 3:1 in order to assure that the scrap extruded therethrough does not have a thin sheet-like form. The purpose of the notches as will be explained, is the provision of relief passageways in the die halves through which surplus plastic material may be extruded during the final deformation period. This permits the stamping operation to proceed with a reduction of required stamping force and/or extrusion time.

With any die pair for stamping pin-die articles, as the die halves approach mutual contact the force required to extrude the remaining surplus product at a given rate becomes progressively greater. Similarly, if the available hold time is reduced, the required force is increased accordingly. For example, when using an unrelieved skirted die with a $1/32''$ to $1/16''$ wide land for stamping bars of milled soap which are of a size normally referred to as "regular" (i.e., having dimensions roughly in the range of 2" to 2¼" in width and 3" to 3½" in length), a force of about 5,000 to 6,000 pounds is required to form a good quality product using a hold time of approximately one second. If the above hold time is reduced to 0.5 second, then the required force increases to about 8,000 to 10,000 pounds. If the force is not increased, the operation will not extrude sufficient surplus material, engendering poor scrap "pinch off," the production of oversize and overweight bars, and thus adversely affecting bar appearance and causing problems in subsequent packaging operations. If a plurality of such die pairs are mounted on a single machine and are designed to stamp bar soaps in unison or with overlapping extrusion cycles, the total stamping force which must be exerted by the machine is the product of the number of dies and the force required per die pair. Thus, five of such die pairs simultaneously operating and utilizing a one second hold time will require a cumulative force of about 25,000 to 30,000 pounds. But if the hold time is reduced (so as to increase production rates) to 0.5 second, then the required cumulative force increases to about 40,000 to 50,000 pounds. It will be readily seen, however, that such an increase will substantially change the loading on the machine and could overstress the machine components if the design load is exceeded. An increase in the loading on each die pair also has another drawback—it substantially increases the propensity of the formed article to stick to the cavities 14 upon separation of the die halves 12 and 13. Such sticking, and especially the sticking of articles on automatic stamping equipment, can greatly lower machine efficiency and deleteriously affect the quality of product produced.

By employment of the notches 15a in connection with die pairs used in the above example and using the reduced hold time (0.5 second) to produce identical bars from identical blanks, the required pressure need only amount to about 6,000 to 7,500 pounds, a reduction of about 25% of that required where an unrelieved die is used. In addition, such lower pressure will reduce bar sticking by approximately 25%.

A skirt member 16 is adapted to receive one of the die halves in an aperture 16a extending through the skirt member 16. Although the specific design of skirt member 16 is not important so long as the elements thereof combine to enclose upper die half 12, along its sides while leaving the die ends uncovered, the drawing shows the skirt member 16 as having a body with opposed depending portions or skirts 17 along the longitudinal edges of aperture 16a. The aperture 16a is sized and shaped to hold the die half snugly therein, preventing relative horizontal movement between the parts which could cause misalignment of die halves in the stamping operation. In the embodiment shown in the drawings, the skirt member 16 is applied to upper die half 12, with the depending skirts 17 thereof extending downwardly a short distance past the land 15. The inner surface of each of the skirts 17 generally follows the same contour as aperture 16a, engaging a substantial and continuous part of the outer longitudinal edge of the land 15 to which it is contiguous in a close sliding fit; however, the lowermost edge of the inner skirt surface is rounded or chamfered at 17a to provide a lead-in surface, the purpose of which will be more fully explained hereinafter. It should be noted that the body portion of skirt member 16 covers only a part of each end of the outer vertical surface of upper die half 12, and as a consequence, no part of the skirt member 16 is adjacent to or depends past the end portions of land 15 of upper die half 12.

One or more exhaust ports or vents 18, which extend through each of the skirts 17 at points aligned with the longitudinal sides of land 15, permit the escape of stamp die liquor and air which may be entrapped during the stamping process. In the absence of such provision for the escape of liquor and air, the entrapped liquor or gas could prevent the soap from completely filling the die cavities in a lateral direction. It has been found that for best operation, the ports 18 should be sized to fall in the range of from .0156″ to .020″ in diameter.

Figure 2:
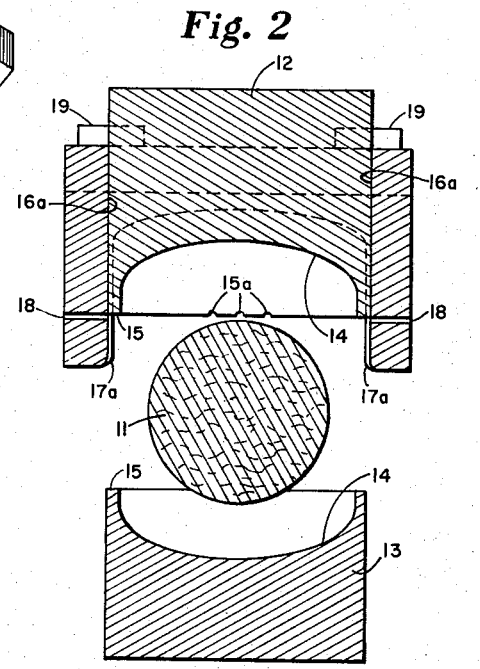
FIGURE 2 is a section of the skirted die of FIGURE 1 taken along line 2—2 thereof.
Figure 4:
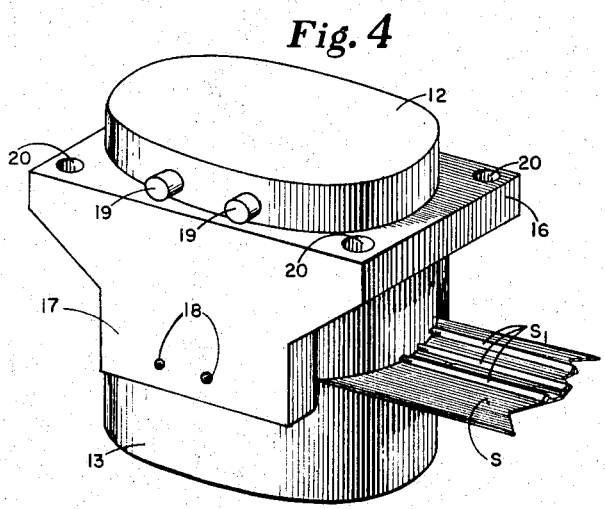
FIGURE 4 is a perspective view from above showing the skirted die pair of FIGURE 1 approaching the full impression position.
Figure 3:
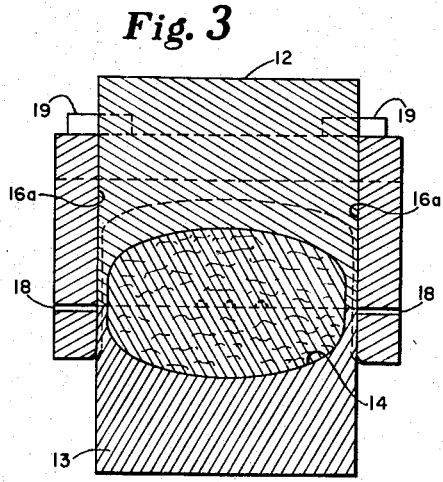
FIGURE 3 is a section similar to that of FIGURE 2, taken at the time the skirted die has made a full impression on the soap blank.

As shown in FIGURES 2 through 4, several supporting pins 19 are driven into holes drilled into the outer vertical surface of upper die half 12 extending beyond the top of skirt member 16. The locations of the pins are such that when the lowermost surfaces of the pins 19 contact the top surface of the skirt member 16, the upper die half 12 is supported in correct vertical alignment with skirt member 16 and the exhaust ports 18 therein.

There are a multitude of ways in which the skirted die of this invention can be attached to a stamping machine. For example, an upper die plate could be mounted over the assembled upper die half 12 and skirt member 16 by being bolted to the skirt member 16 by means of the threaded holes 20 shown in FIGURE 4, thus forcing and retaining pins 19 of the die half 12 in contact with the skirt member 16, and thereby eliminating relative vertical movement therebetween. Then the upper die plate could be fastened in some manner to an upper die platen which in turn is attached to the die plunger of the stamping machine. The lower die half 13 could be similarly attached by means of a lower die plate and a lower die platen to the die slide of the machine. Since such means are well known in the art and play no part in this invention they have been omitted from the drawing and from the detailed description of this invention in order to simplify the disclosure.

In the die "set-up" and in use, there is no need for the guide pins and guide bushings which are normally a part of the prior art dies for producing pin-die shaped articles. The skirt functions to provide both the preliminary alignment and the "running" guide needed during the stamping operation, in addition to the principal function hereinafter described. The die set-up is facilitated by mounting the parts of the die upon the stamping machine so that one or both parts are free to be adjusted in location, bringing the die parts together into a full impression position, and then tightening or fastening such parts securely to the machine while they are held in this position.

The function of the skirt in providing a "running" guide is important for good stamping operation since there is usually at least a slight amount of play between the die plunger and the die slide parts of a stamping machine. Such play is compensated for by the funneling effect of the rounded or chamfered interior edges (lead-in surfaces) of the skirt 17, and by means thereof the lower die half 13 is deflected into registry with the interior surface of the skirt 17 as the dies move together in use, placing the die halves in perfect vertical alignment.

After the skirted die has been mounted upon the stamping machine, the stamping operation may be described as follows: A soap blank 11 of the proper size and plastic consistency and which has been treated with stamp die liquor is placed or fed between the die halves 12 and 13 when they are in the open position and the die halves are then brought together or into very close proximity under considerable force. As the opposed die halves approach each other, the intervening soap blank 11 is squeezed between the die cavities 14 of the die halves 12 and 13 and thus caused to be compressed in height and expanded in width. Upon continued relative movement as the die halves approach, the skirt 17 telescopes over lower die half 13 and further deformation of the soap blank 11 occurs until finally the deformed blank fills the volume intermediate the die halves at a point in time prior to the time at which the die halves reach the full impression position. During this initial deformation period, any stamp die liquor and/or air which may be entrapped between the dies are exhausted through ports 18. Final deformation thereafter occurs until the die halves reach the full impression position, and it is during this phase that the principal function of skirts 17 comes into play—blocking further expansion of the deformed blank 11 in width and directing all surplus soap in a substantially longitudinal direction so as to be extruded between specific corresponding minor portions of the lands 15, from the die ends of the illustrated embodiment. Lateral extrusion is effectively prevented by the close fit of the upper die half 12 in the aperture 16a of skirt member 16 and of the lower die half 13 with the inner surfaces of skirts 17 and by the skirt material itself closing egress from between the die halves. Of course, an extremely small amount of soap will enter the ports 18 but such is insignificant in its effect upon the bar quality when ports of the preferred size (i.e., in the .0156″ to .020″ diameter range) are used. Along this same line it has been noted that during continuous operation of the skirted die of this invention, an extrusion of soap into ports of the preferred size does not prevent the escape of air and die liquor therethrough in subsequent stampings since the die is, in effect, self-cleaning in this respect.

During the portion of the cycle in which extrusion occurs, the surplus material will be squeezed from between the dies at the ends thereof, starting as a "chunk-like" primary extrusion which rapidly tapers to a ribbon-like form of secondary extrusion. It is during the period of secondary extrusion (the form of which is illustrated at S on the right side of FIGURE 4) that the effect of the notches 15a comes into play. As shown, the secondary extrusion from this embodiment includes integral, spaced parallel ribs or strings S' of scrap formed by extrusion through the notches 15a simultaneously with the extrusion of the balance of the ribbon through the adjacent space intervening the corresponding end portions of the lands 15 of the die halves.

As the opposed lands 15 are brought contiguous to one another at the conclusion of the final deformation of the blank 11, the pressure exerted upon any soap which lies between the lands causes substantially all of such soap to be extruded as scrap along with the other surplus soap or to be forced into the bar being formed. In any event, at the full impression position of the cycle or shortly thereafter, the severing of the scrap from the formed bar is accomplished by the pinching off mechanisms described in the aforesaid copending application, and the extruded scrap at each end falls into scrap receiving devices (not shown) adapted to receive such material. Subsequently, the die halves may be moved to an open position and the stamped bar removed by hand or by rotation of the die halves or by other well known means so as to prepare the dies for the next stamping operation.

The flat portion of the secondary extrusion (the portion underlying and interconnecting the ribs or strings S' of scrap extruded through the notches 15a) may, at times, be pinched off prior to the termination of the extrusion of the strings S'. Thus, the last portion of the secondary extrusion will sometimes consist wholly of unconnected strings S'. Under such circumstances, the unconnected strings S' may break off at the points of interconnection with the formed bar, in which case no undesirable surface blemishes will appear on the product. However, the strings S' will occasionally break off outwardly of those points, leaving small nibs of the strings S' projecting from the bar. If such nibs (not shown) are objectionable they can be removed quite readily by means of brushes, trimming knives or the like mounted on the sides of subsequent product conveying mechanisms or by any number of other types of devices well known in the art for removing minor amounts of flash protruding from specific locations on a formed object. This aspect of processing of the formed bar is not a part of the present invention and, hence, not described in detail.

Figure 5:
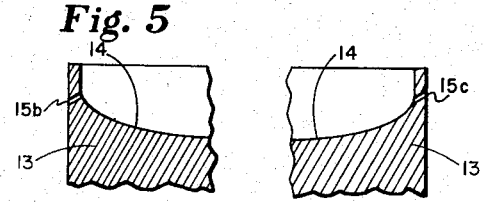
FIGURE 5 is a composite fragmentary sectional view of the lower die half illustrating two modified forms of relief means.

FIGURE 5 illustrates two different modifications of the die pair described above, both of which eliminate the possibility of producing bars having the projecting nibs mentioned above. In these embodiments, the notches 15a of the upper die half 12 are not employed and the land 15 thereof is made continuous. As shown in the composite figure, both modifications of the relief means may be incorporated on the lower die half 13. On the left side one modification comprises a multiplicity of passageways 15b extending from the substantially vertical end wall 14b of the cavity 14 downwardly, at a considerable angle with the vertical axis of the die pair, through to the exterior of the die half 13. The embodiment on the right side of FIGURE 5 comprises a multiplicity of passageways 15c also extending from a substantially vertical end wall 14c of the cavity 14. Passageways 15c, however, proceed upwardly to the exterior of the die half 13. The minimum individual areas and cumulative areas for the passageways 15b and 15c are the same as recited above in connection with notches 15a.

In use, each of the embodiments of FIGURE 5 operates to relieve pressure, bar sticking and/or shorten hold time in the stamping cycle in the same manner as discussed above with respect to notches 15a. However, due to the fact that the passageways 15b and 15c extend outwardly from substantially vertical surfaces, when the finished bar is removed (lifted vertically) from the lower die half 13 the strings of scrap extruded through the relief passageways are sheared off at their points of connection to the formed bar to thereby render impossible the production of product which includes the projections or nibs described previously. The strings of surplus material which emanate fom the relief passageways 15b or 15c can also be collected in scrap receiving devices; in this connection it may sometimes be advantageous to extrude the strings downwardly, directly into such devices, by using only passageways such as 15b. Alternatively if it is desirable to handle the strings along with the secondary form of extrusion from between the end portions of the lands 15 above, then the string extrusion can be directed upwardly by relief means such as passageways 15c. In this case it is possible that with some types of plastic material the strings of scrap will attach themselves to the lower surface of such secondary extrusion and will, consequently, be more easily handled than the separate strings.

The die pair of this invention substantially retains all the advantages of the skirted die of copending application Ser. No. 81,037 (i.e., elimination of hairline cracks, clean separation of scrap from product without complicated trimming devices for removing scrap from all portions of the parting line and concentration of scrap for ease of collection) while permitting the use of considerably lower stamping pressure, eliminating excessive bar sticking and/or substantially reducing hold time for the formation of good quality product. This improvement is of especial importance in connection wtih high speed production stamping operations.

Many modifications of the above invention may be used and it is not intended to hereby limit it to the particular embodiment shown or described. For example, the notches 15a of the die pair could be made in the land 15 of the lower die half 13, or the modified forms of relief means, passageways 15b and 15c, could be made in the upper die half 12 instead of in the lower die half 13. In addition, the inventive concept hereof could be incorporated in the skirted die improvement disclosed in the application for U.S. Letters Patent filed concurrently herewith in the name of Donald S. Wall. The concurrently filed application relates to a skirted die pair for rotary presses and includes provision for restricting the character of the extrusion from one end of the die pair to the primary or chunk-like from. The present invention can be applied to such a die pair by placing the relief means on the end of the die pair from which secondary extrusion is permitted to occur. The terms used in describing the invention are used in their descriptive sense and not as terms of limitation, it being intended that all equivalents thereof be included within the scope of the appended claims.

What is claimed is:

1. In a die pair for stamping a blank of plastic material into a pin-die shaped article, said die having in combination:
    a pair of mating die halves each having a cavity bounded by a land, said lands being adapted to substantially contact one another in use,
    means for restricting the extrusion of surplus plastic material whereby substantially all of such extrusion occurs between specific corresponding minor portions of said lands during the period of final deformation of said plastic material,
    the improvement which comprises relief means for reducing the hold time and force required to complete the extrusion and separation of said surplus plastic material, said relief means comprising a pluraltiy of passageways in said die halves extending to the enclosure formed by said cavities during the said period of final deformation, said passageways interconnecting said enclosure with the exterior of the die pair to establish a path of unimpeded egress therefrom in the full impression position, said passageways having a cumulative cross sectional area of at least about .0036 square inch and each having a minimum cross sectional area of about .0007 square inch in which the width to height ratio does not exceed about 3:1.

2. The die pair of claim 1 in which said passageways are formed by notches made in said specific minor portions of the land of at least one die half.

3. The die pair of claim 1 in which said passageways extend from a substantially vertical wall adjacent said specific minor portions of said lands.

References Cited
UNITED STATES PATENTS

| | | | |
|---|---|---|---|
| 305,293 | 9/1884 | Collier | 25—7 X |
| 769,172 | 9/1904 | Langguth | 25—7 |
| 1,340,452 | 5/1920 | Landstra | 25—27 X |
| 3,159,699 | 12/1964 | Sutphin | 264—320 |

FOREIGN PATENTS 1,151,087  7/1963  Germany.

WILLIAM J. STEPHENSON, *Primary Examiner.*